United States Patent
Jiang et al.

(10) Patent No.: US 12,179,314 B2
(45) Date of Patent: Dec. 31, 2024

(54) POLISHING LIQUID SUPPLY SYSTEM

(71) Applicant: CHANGXIN MEMORY TECHNOLOGIES, INC., Hefei (CN)

(72) Inventors: Fuyou Jiang, Hefei (CN); Hung-Hsiang Kuo, Hefei (CN); Chin-Chung Ku, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 760 days.

(21) Appl. No.: 17/426,196

(22) PCT Filed: Feb. 9, 2021

(86) PCT No.: PCT/CN2021/076408
§ 371 (c)(1),
(2) Date: Jul. 28, 2021

(87) PCT Pub. No.: WO2021/164674
PCT Pub. Date: Aug. 26, 2021

(65) Prior Publication Data
US 2022/0314399 A1   Oct. 6, 2022

(30) Foreign Application Priority Data

Feb. 18, 2020 (CN) .......................... 202010099687.4

(51) Int. Cl.
*B24B 57/02* (2006.01)
*B01D 35/12* (2006.01)
*B01D 35/157* (2006.01)

(52) U.S. Cl.
CPC .............. *B24B 57/02* (2013.01); *B01D 35/12* (2013.01); *B01D 35/1573* (2013.01); *B01D 2201/085* (2013.01); *B01D 2201/167* (2013.01)

(58) Field of Classification Search
CPC ....................................................... B24C 7/003
See application file for complete search history.

(56) References Cited

U.S. PATENT DOCUMENTS

| | | | |
|---|---|---|---|
| 6,165,048 A * | 12/2000 | Russ ....................... | B24B 37/04 451/60 |
| 2004/0014403 A1* | 1/2004 | Oberkampf ............. | B24B 57/02 451/60 |
| 2010/0224256 A1* | 9/2010 | Tseng ...................... | G01F 11/28 137/565.29 |

FOREIGN PATENT DOCUMENTS

| CN | 1356369 A | 3/2002 |
|---|---|---|
| CN | 101823234 B | 9/2010 |

(Continued)

OTHER PUBLICATIONS

CN-108890408-A espacenet (Year: 2024).*

(Continued)

*Primary Examiner* — Brian D Keller
*Assistant Examiner* — Tim Brady
(74) *Attorney, Agent, or Firm* — Kilpatrick Townsend & Stockton LLP

(57) ABSTRACT

Some embodiments of the present application disclose a polishing liquid supply system. In the present application, the polishing liquid supply system includes: a polishing liquid preparation device, a cleaning liquid supply device and a filtering device, and further includes a supply pipeline connected with the polishing liquid preparation device and the filtering device and a cleaning pipeline connected with the cleaning liquid supply device and the filtering device. The polishing liquid preparation device is configured to prepare a polishing liquid and convey the prepared polishing liquid to the filtering device through the supply pipeline. The filtering device is configured to filter the polishing liquid and convey the filtered polishing liquid to a polishing device connected with the filtering device. The cleaning liquid supply device is configured to convey a cleaning liquid to the filtering device through the cleaning pipeline.

11 Claims, 4 Drawing Sheets

(56) References Cited

FOREIGN PATENT DOCUMENTS

| | | | | |
|---|---|---|---|---|
| CN | 102001044 A | 4/2011 | | |
| CN | 102580953 A | 7/2012 | | |
| CN | 102806526 A | 12/2012 | | |
| CN | 205465749 U | 8/2016 | | |
| CN | 206123453 U | 4/2017 | | |
| CN | 207223702 U | 4/2018 | | |
| CN | 208913880 U | 4/2018 | | |
| CN | 108890408 A | * 11/2018 | ............... | B24B 1/04 |
| CN | 209021758 U | 6/2019 | | |
| JP | 08150551 A | 6/1996 | | |

OTHER PUBLICATIONS

International Search Report for International Application PCT/CN2021/076408 dated Apr. 28. 2021.
Office Action and search report for Chinese patent application No. 202010099687.4, dated May 7, 2022, 7 pages.

* cited by examiner

POLISHING LIQUID SUPPLY SYSTEM

CROSS-REFERENCE TO RELATED APPLICATIONS

This application is a national stage entry of International Patent Application No. PCT/CN2021/076408, filed on Feb. 9, 2021, which claims priority to Chinese Patent Application No. 202010099687.4, filed on Feb. 18, 2020, the entire contents of which are incorporated herein by reference.

TECHNICAL FIELD

Embodiments of the present application relate to the field of semiconductor processing technologies, and more particularly, to a polishing liquid supply system.

BACKGROUND

Chemical mechanical polishing (CMP) is also referred to as chemical mechanical planarization, which is one of the methods of wafer surface planarization. Surface roughness of a wafer can be greatly reduced by CMP, so as to achieve an effect of high-precision planarization. During CMP, a polishing liquid supply system may output a polishing liquid to a polishing pad in a CMP machine, and then, a polishing head sucks the wafer and presses the wafer onto the polishing pad to drive the wafer to rotate. The polishing pad may rotate in a direction opposite to a rotation direction of the polishing head, and a wafer surface may be planarized by friction between the wafer and the polishing pad. In general, the polishing liquid is mainly aqueous-solution-based complex suspensions, including abrasives of silica, alumina and ceria, and chemical additives. The polishing liquid supply system requires multiple processing steps for a raw polishing liquid to produce a polishing liquid that can be outputted to the CMP machine. A filtering step for the polishing liquid is extremely important.

SUMMARY

Some implementations of the present application are intended to provide a polishing liquid supply system, which can not only improve cleaning efficiency of a filtering device, but also ensure that the residual polishing liquid in the filtering device does not drip down, thereby improving reliability of the polishing liquid supply system.

In order to solve the above technical problems, some embodiments of the present application provide a polishing liquid supply system, including: a polishing liquid preparation device, a cleaning liquid supply device and a filtering device, and further including a supply pipeline connected with the polishing liquid preparation device and the filtering device and a cleaning pipeline connected with the cleaning liquid supply device and the filtering device; the polishing liquid preparation device being configured to prepare a polishing liquid and convey the prepared polishing liquid to the filtering device through the supply pipeline; the filtering device being configured to filter the polishing liquid and convey the filtered polishing liquid to a polishing device connected with the filtering device; and the cleaning liquid supply device being configured to convey a cleaning liquid to the filtering device through the cleaning pipeline.

BRIEF DESCRIPTION OF DRAWINGS

One or more embodiments are exemplarily described by using figures that are corresponding thereto in the accompanying drawings; the exemplary descriptions do not constitute limitations on the embodiments. Elements with same reference numerals in the accompanying drawings are similar elements. Unless otherwise particularly stated, the figures in the accompanying drawings do not constitute a scale limitation.

DESCRIPTION OF EMBODIMENTS

In order to make the objectives, technical solutions and advantages of the present application clearer, the embodiments of the present application will be described in detail below with reference to the accompanying drawings. However, those skilled in the art should understand that many technical details have been presented in the embodiments of the present application in order to make the present application better understood by readers. However, even without these technical details and various changes and modifications based on the following embodiments, the technical solution claimed in the present application can also be achieved.

Figure 1:
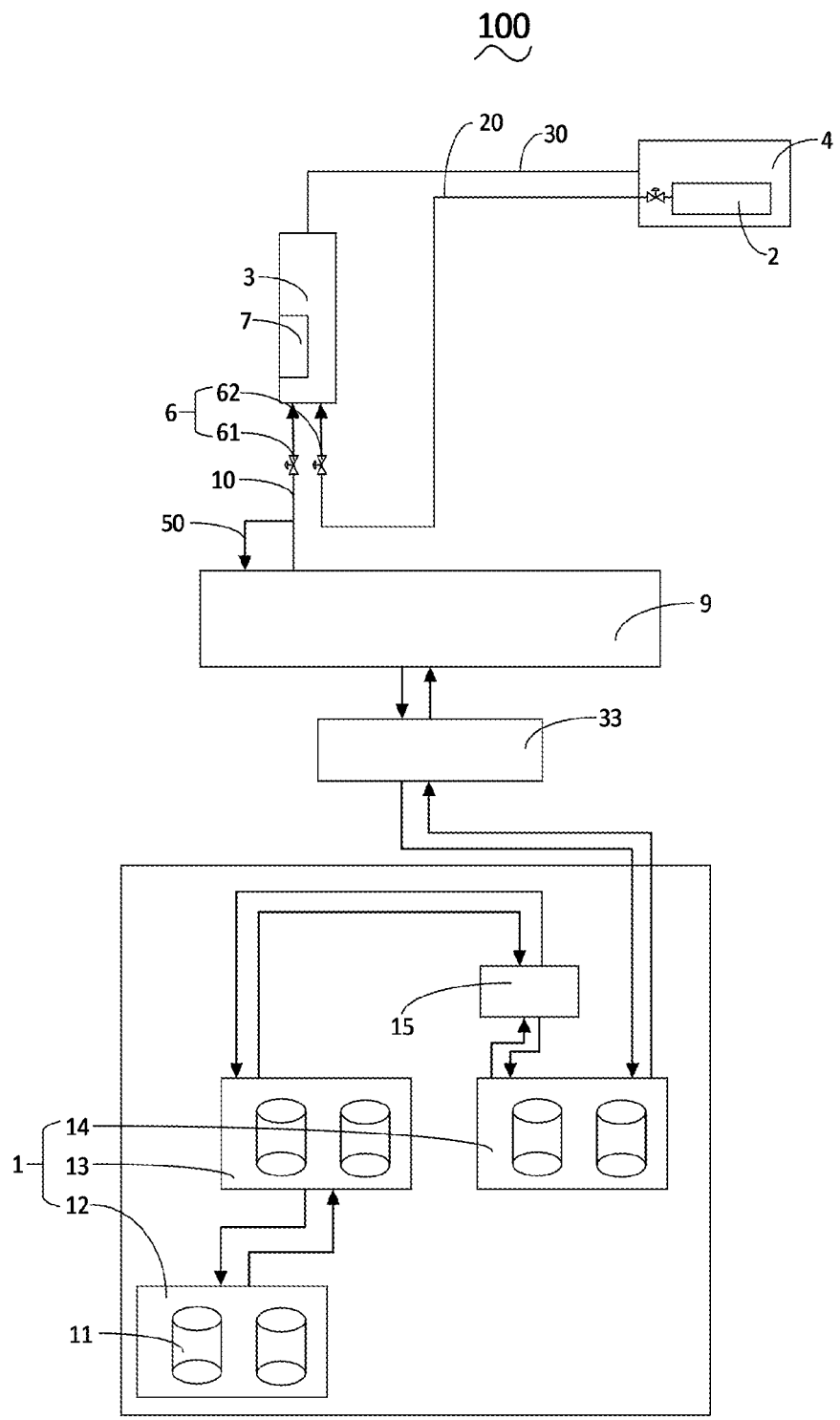
FIG. 1 is a schematic structural diagram of a polishing liquid supply system according to an embodiment of the present application.
Figure 2:
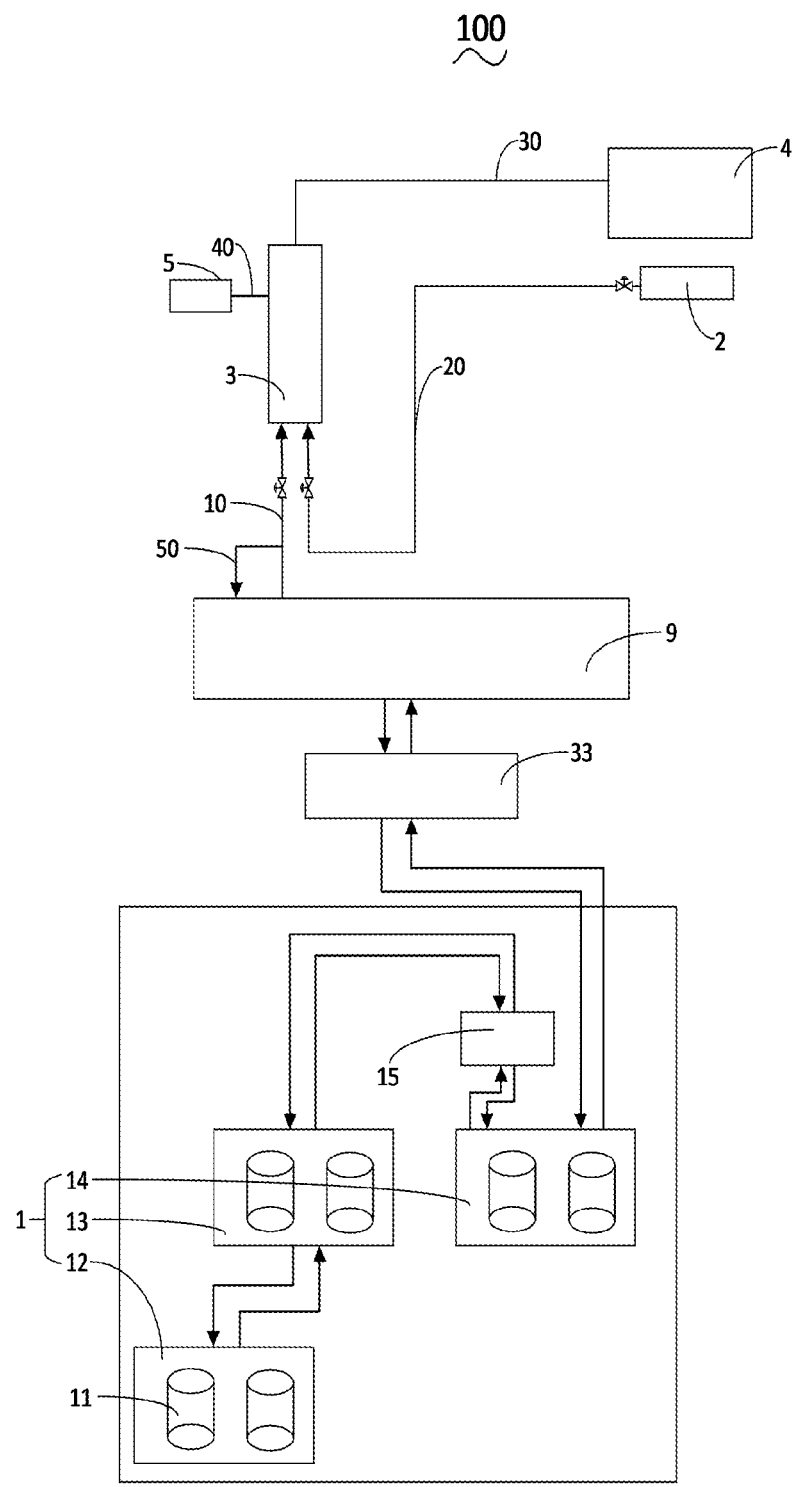
FIG. 2 is another schematic structural diagram of a polishing liquid supply system according to an embodiment of the present application.

One embodiment of the present application relates to a polishing liquid supply system 100, with a specific structure as shown in FIG. 1 and FIG. 2, including:

a polishing liquid preparation device 1, a cleaning liquid supply device 2 and a filtering device 3, and further including a supply pipeline 10 connected with the polishing liquid preparation device 1 and the filtering device 3 and a cleaning pipeline 20 connected with the cleaning liquid supply device 2 and the filtering device 3. The polishing liquid preparation device 1 is configured to prepare a polishing liquid and convey the prepared polishing liquid to the filtering device 3 through the supply pipeline 10. The filtering device 3 is configured to filter the polishing liquid and convey the filtered polishing liquid to a polishing device 4 connected with the filtering device 3. The cleaning liquid supply device 2 is configured to convey a cleaning liquid to the filtering device 3 through the cleaning pipeline 20.

Specifically, the polishing device 4 in the present embodiment may be a CMP machine. In the CMP machine, a polishing head sucks a wafer and presses the wafer onto a polishing pad to drive the wafer to rotate, and the polishing pad rotates in a direction opposite to a rotation direction of the polishing head. During polishing, the polishing liquid supply system injects the polishing liquid into the CMP machine. The polishing liquid may effectively reduce the wear of the polishing head and may not cause damages to the CMP machine.

It may be understood that the polishing liquid prepared by the polishing liquid preparation device 1 contains large particulate matter (the large particulate matter has a diameter generally between 1 micron and 5 microns). The filtering device 3 is provided, so that the large particulate matter in the polishing liquid can be filtered out to ensure that the diameter of the particulate matter in the polishing liquid is less than a second particle size. The second particle size may be between 0.2 micron and 0.3 micron, so as to ensure the polishing effect of the polishing device 4. In addition, the cleaning liquid in the present embodiment may be cleaning water or other liquids capable of cleaning the large particulate matter in the filtering device 3. The type of the cleaning liquid is not specifically limited in the present embodiment.

Referring to FIG. 1, the filtering device 3 conveys the polishing liquid to the polishing device 4 through a drain pipeline 30, and the cleaning liquid supply device 2 is arranged in the polishing device 4 and may be a cleaning water supply device arranged in the polishing device 4. The cleaning pipeline 20 is led out from the cleaning liquid supply device 2 in the polishing device 4 to connect the filtering device 3. For example, the cleaning pipeline 20 led out may be connected through a three-way valve, and after the cleaning liquid in the cleaning liquid supply device 2 flows through the filtering device 3 and cleans the filtering device 3, the cleaning liquid after use may flow through the drain pipeline 30 to the polishing device 4 and then be discharged. With such structural settings, the structure of the polishing liquid supply system 100 can be simplified, and the production cost of the polishing liquid supply system 100 can be reduced.

Referring to FIG. 2, the polishing liquid supply system 100 further includes a cleaning liquid treatment device 5. The cleaning liquid treatment device 5 is connected with the filtering device 3 through a treatment pipeline 40. The filtering device 3 conveys the polishing liquid to the polishing device 4 through the drain pipeline 30. The cleaning liquid supply device 2 is arranged outside the polishing device 4. After the cleaning liquid in the cleaning liquid supply device 2 flows through the filtering device 3 and cleans the filtering device 3, the cleaning liquid after use may flow through the treatment pipeline 40 to the cleaning liquid treatment device 5. If the polishing liquid and the cleaning liquid are both conveyed to the polishing device 4 through the drain pipeline 30, next time the polishing liquid is conveyed to the polishing device 4 after the filtering device 3 is cleaned, if there is any residual cleaning liquid in the drain pipeline 30, the residual cleaning liquid may be blended with the polishing liquid, resulting in a temporary low concentration of the new outputted grinding liquid. The cleaning liquid treatment device 5 is provided, so that the sharing of one drain pipeline 30 by the polishing liquid and the cleaning liquid can be avoided, thereby ensuring the concentration of the polishing liquid outputted after filtration.

According to the embodiment of the present application, the supply pipeline 10 connected with the polishing liquid preparation device 1 and the filtering device 3 and the cleaning pipeline 20 connected with the cleaning liquid supply device 2 and the filtering device 3 are provided, so that when the polishing liquid is required to be supplied to the polishing device 4, the supply pipeline 10 can be controlled to open and the cleaning pipeline 20 can be controlled to close, enabling the polishing liquid to be conveyed to the filtering device 3 through the supply pipeline 10, and then, the filtering device 3 conveys the filtered polishing liquid to the polishing device 4. When the filtering device 3 is required to be cleaned, the supply pipeline 10 can be controlled to close and the cleaning pipeline 20 can be controlled to open, so that the cleaning liquid can be conveyed to the filtering device 3 through the cleaning pipeline 20 to clear residues in the filtering device 3. That is, the supply process of the polishing liquid and the cleaning process of the filtering device 3 may both be completed by the polishing liquid supply system 100. The two processes may be switched without disassembly of any equipment, which avoids the case where "it takes a long time to disassemble the filtering device, and the filtering device is required to be re-mounted after disassembly, which leads to low cleaning efficiency of the filtering device; and during the disassembly of the filtering device, the residual polishing liquid in the filtering device may drip down, which causes the pollution of an internal circuit in the CMP machine and makes the reliability of the polishing liquid supply system not high", and can ensure that the residual polishing liquid in the filtering device 3 may not drip down while the cleaning efficiency of the filtering device 3 is improved, thereby improving the reliability of the polishing liquid supply system 100.

The following is a specific description of the implementation details of the polishing liquid supply system 100 according to the present embodiment. The following contents are only provided to easily understand the implementation details, and are not necessary for the implementation of the solution.

Figure 3:
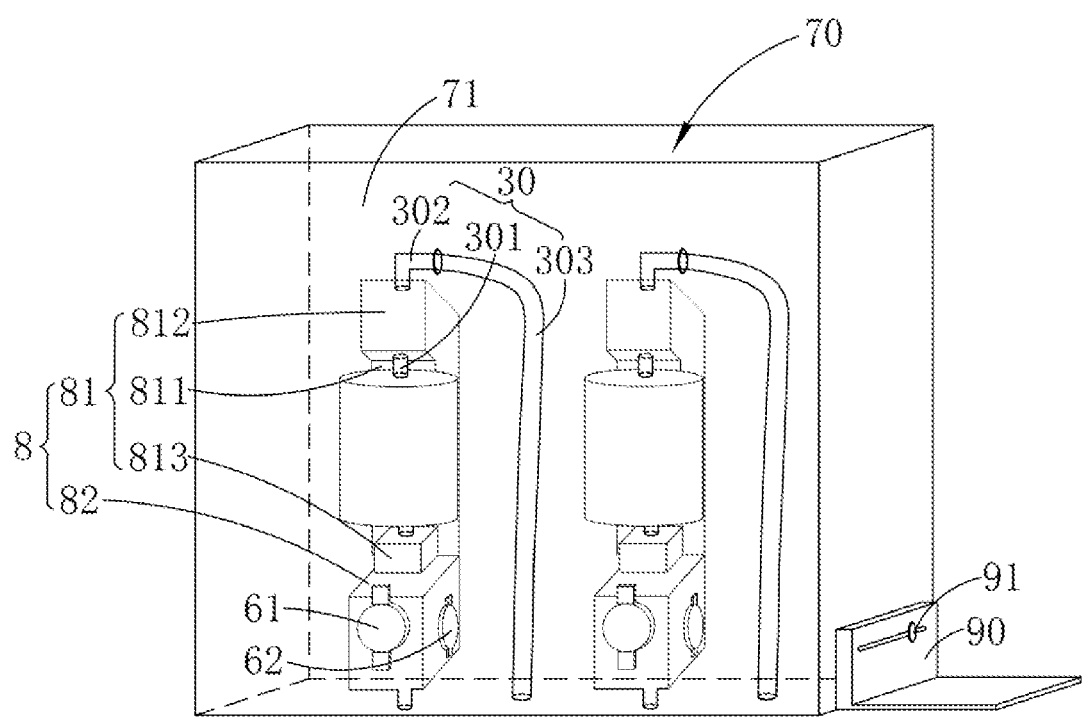
FIG. 3 is a schematic diagram of a three-dimensional structure of a polishing liquid supply system according to an embodiment of the present application.

In the present embodiment, as shown in FIG. 1 and FIG. 3, the polishing liquid supply system 100 further includes a combination valve 6. The combination valve 6 includes a first control valve 61 and a second control valve 62. The first control valve 61 is arranged on the supply pipeline 10, and the second control valve 62 is arranged on the cleaning pipeline 20. The first control valve 61 and the second control valve 62 may be manual valves or solenoid valves. With such structural settings, the supply pipeline 10 and the cleaning pipeline 20 can open and close by controlling the combination valve 6, such that the structure is simple, and the production cost and operation difficulty of the polishing liquid supply system 100 are reduced.

Preferably, a control system (not shown in the figure) is further included. The control system is in communication connections with the first control valve 61, the second control valve 62 and the polishing device 4. The polishing device 4 is further configured to send a first instruction to the control system when the polishing liquid is needed, and the control system is configured to control the first control valve 61 to switch-on and the second control valve 62 to switch-off after receiving the first instruction. In this way, the polishing liquid supply system 100 can be more intelligent and automatic without manual operation when the polishing liquid is needed in the polishing device 4.

More preferably, an impurity detection device 7 is further included. The impurity detection device 7 is arranged in the filtering device 3, in a communication connection with the control system, and configured to send a second instruction to the control system when impurities in the filtering device 3 exceed a preset threshold, and the control system is further configured to control the first control valve 61 to switch-off and the second control valve 62 to switch-on after receiving the second instruction. The impurity detection device 7 is provided, so that when the impurities in the filtering device 3 exceed the preset threshold, the control system can automatically clean the filtering device 3 without manual operation of the control valve, thereby further reducing the labor cost.

It should be noted that the supply pipeline 10 and the cleaning pipeline 20 are arranged at the bottom of the filtering device 3, the top of the filtering device 3 is further provided with a drain pipeline 30, and the drain pipeline 30 is configured to convey the filtered polishing liquid outputted from the filtering device 3 to the polishing device 4. That is, the filtering device 3 is vertically mounted in the polishing liquid supply system 100. This is because the polishing device 4 is arranged above the polishing liquid preparation device 1 during practical applications, so the polishing liquid flows vertically upward to the polishing device 4. The filtering device 3 is arranged in a direction the same as the flow direction of the polishing liquid, which can facilitate the operation of the combination valve 6, facilitate bubble discharge of a polishing liquid filter, and reduce a risk of bending the pipeline.

It should be noted that as shown in FIG. 3, a mounting box 70 is further included. The mounting box 70 includes a fixing bracket 8. The fixing bracket 8 is configured to fix the combination valve 6 and the filtering device 3 into the mounting box 70. Specifically, the fixing bracket 8 includes a first bracket 81 and a second bracket 82, the first bracket 81 is fixedly connected to the combination valve 6, the combination valve 6 is fixedly connected to the filtering device 3, and the filtering device 3 is fixedly connected to the second bracket 82. More specifically, the first bracket 81 includes a vertical portion 811 fitting and fixed to a sidewall 71 of the mounting box 70, a first horizontal portion 812 bending and extending from one end of the vertical portion 811 in a direction away from the sidewall 71 and a second horizontal portion 813 bending and extending from the other end of the vertical portion 811 in the direction away from the sidewall 71. The first horizontal portion 812 is fixedly connected to the top of the filtering device 3, and the second horizontal portion 813 is fixedly connected to the bottom of the filtering device 3, so that the filtering device 3 fixed to the fixing bracket 8 is vertically upward. The drain pipeline 30 includes a front pipeline 301, a bent connector 302 and a rear pipeline 303. The front pipeline 301 may be connected to and penetrate the first horizontal portion 812. The bent connector 302 may be arranged on a top end of the first horizontal portion 812 and may be an L-shaped bent connector or a U-shaped bent connector. The front pipeline 301 and the rear pipeline 303 are connected through the bent connector 302. The rear pipeline 303 may be led out through the bottom of the mounting box 70 and connected to the polishing device 4, which can reduce line disorder and the footprint. Moreover, the bent connector 302 can reduce the risk of bending the drain pipeline 30.

In addition, the mounting box 70 is movably connected to a fixed slot 90 and may be connected to the fixed slot 90 through a fixing bolt 91. After moving to a target position along an extension direction of the fixed slot 90, the mounting box 70 may be fixedly connected to the fixed slot 90 through the fixing bolt 91 to prevent position offset of the mounting box 70. It may be understood that the fixed slot 90 may be arranged on the polishing device 4 or fixedly arranged on the ground. With such structural settings, the mounting box 70 can be independent of the polishing device 4 and can move relative to the polishing device 4, so as to easily clean the mounting box 70 and replace various devices in the mounting box 70.

It may be understood that, since the filtering device 3 is arranged vertically, the polishing liquid supply system 100 according to the present embodiment further includes a centrifugal pump (not shown in the drawing). The centrifugal pump is arranged between the filtering device 3 and the polishing liquid preparation device 1 and configured to pump the polishing liquid in the polishing liquid preparation device 1 into the filtering device 3. The centrifugal pump may also be arranged between the filtering device 3 and the polishing device 4 and configured to pump the filtered polishing liquid in the filtering device 3 into the polishing device 4. Preferably, the centrifugal pump in the present embodiment may be a magnetic levitation water pump. The magnetic levitation water pump has the advantages of high conversion efficiency, low power consumption, unrestricted head, bearings not susceptible to damage, or the like, and the polishing liquid may be prevented from being polluted by granular objects produced by the centrifugal pump, thereby further improving the stability of the polishing liquid supply system 100.

Specifically, a first valve box 9 and a polishing liquid circulation pipeline 50 are further included. The polishing liquid circulation pipeline 50 is connected with the polishing liquid preparation device 1 and the filtering device 3 through the first valve box 9, and the first valve box 9 is configured to control the polishing liquid to be transferred from the filtering device 3 through the polishing liquid circulation pipeline 50 to the polishing liquid preparation device 1 or control the polishing liquid to be transferred from the polishing liquid preparation device 1 through the supply pipeline 10 to the filtering device 3. During conveyance from the filtering device 3 to the polishing device 4, some residual polishing liquid may not be conveyed to the polishing device 4. The residual polishing liquid may deposit at the bottom of the filtering device 3. The polishing liquid circulation pipeline 50 is provided, so that the residual polishing liquid in the filtering device 3 can be re-conveyed to the first valve box 9 for next use, thereby recycling the polishing liquid and reducing the polishing cost. It may be understood that a control valve may be arranged on the polishing liquid circulation pipeline 50. When the polishing liquid is supplied to the polishing device 4, the control valve for controlling opening and closing of the polishing liquid circulation pipeline 50 closes to prevent the polishing liquid from flowing back to the first valve box 9 at this point. Upon completion of the supply, the control valve opens to allow the residual polishing liquid to flow back to the first valve box 9.

Preferably, a primary filtering device 33 is further arranged between the first valve box 9 and the polishing liquid preparation device 1 and configured to filter particles with particle sizes greater than a first particle size, the filtering device 3 is configured to filter particles with particle sizes greater than a second particle size, and the first particle size is greater than the second particle size. The primary filtering device 33 is provided, so that large particulate matter in the polishing liquid can be preliminarily filtered out to ensure that a diameter of the particulate matter in the polishing liquid is less than the first particle size. The first particle size may be 1 micron, 3 microns or 5 microns. The polishing liquid after preliminary filtration undergoes secondary filtration through the filtering device 3. With such structural settings, the filtering effect of the polishing liquid can be improved, so as to provide a polishing liquid with fewer impurities for the polishing device 4, thereby improving the polishing performance of the polishing device 4.

It should be noted that the polishing liquid preparation device 1 includes a plurality of polishing liquid supply modules 11. At least one of the plurality of polishing liquid supply modules 11 is connected with the filtering device 3 through the supply pipeline 10. That is, the polishing liquid supply system 100 adopts multi-barrel supply. When the polishing liquid is required to be supplied to the polishing device 4, one of the plurality of polishing liquid supply modules 11 conveys the polishing liquid to the filtering device 3, and another of the plurality of polishing liquid supply modules 11 may prepare or maintain the polishing liquid, which can increase the buffer time of replacement of the polishing liquid. The dilution, supply and maintenance of the polishing liquid are not affected by one another, thereby increasing the production capacity. It may be understood that the number of the polishing liquid supply modules 11 is not specifically limited in the present embodiment, and different numbers of polishing liquid supply modules 11 may be provided as needed.

It should be noted that, as shown in FIG. 2, the polishing liquid preparation device 1 may specifically include a raw polishing liquid supply unit 12, a polishing liquid mixing tank unit 13 connected with the raw polishing liquid supply unit 12 and a polishing liquid supply tank unit 14 connected with the polishing liquid mixing tank unit 13. The polishing liquid supply tank unit 14 is connected with the filtering device 3 through the supply pipeline 10. The raw polishing liquid supply unit 12 is provided therein with a plurality of polishing liquid supply modules 11. After the raw polishing liquid supply unit 12 completes the preparation of the polishing liquid, the prepared polishing liquid is pumped into the polishing liquid mixing tank unit 13 through the centrifugal pump. The polishing liquid mixing tank unit 13 is configured to stir the polishing liquid, and the stirred polishing liquid is pumped into the polishing liquid supply tank unit 14 through the centrifugal pump. The polishing liquid supply tank unit 14 is configured to convey the polishing liquid to the filtering device 3.

Preferably, the polishing liquid mixing tank unit 13 is connected to the polishing liquid supply tank unit 14 through a second valve box 15, and the second valve box 15 is configured to control the polishing liquid to be transferred from the polishing liquid mixing tank unit 13 to the polishing liquid supply tank unit 14 or control the polishing liquid to be transferred from the polishing liquid supply tank unit 14 to the polishing liquid mixing tank unit 13.

More preferably, each of the polishing liquid mixing tank unit 13 and the polishing liquid supply tank unit 14 is provided therein with a polishing liquid measuring instrument (not shown in the drawing). The polishing liquid measuring instrument includes at least one of a specific gravity measuring instrument, a pH measuring instrument and a conductivity measuring instrument. With such structural settings, a variety of chemical parameters (such as pH and conductivity) of the polishing liquid can be known through the polishing liquid measuring instrument, so that the polishing liquid prepared can meet an actual requirement.

Figure 4:
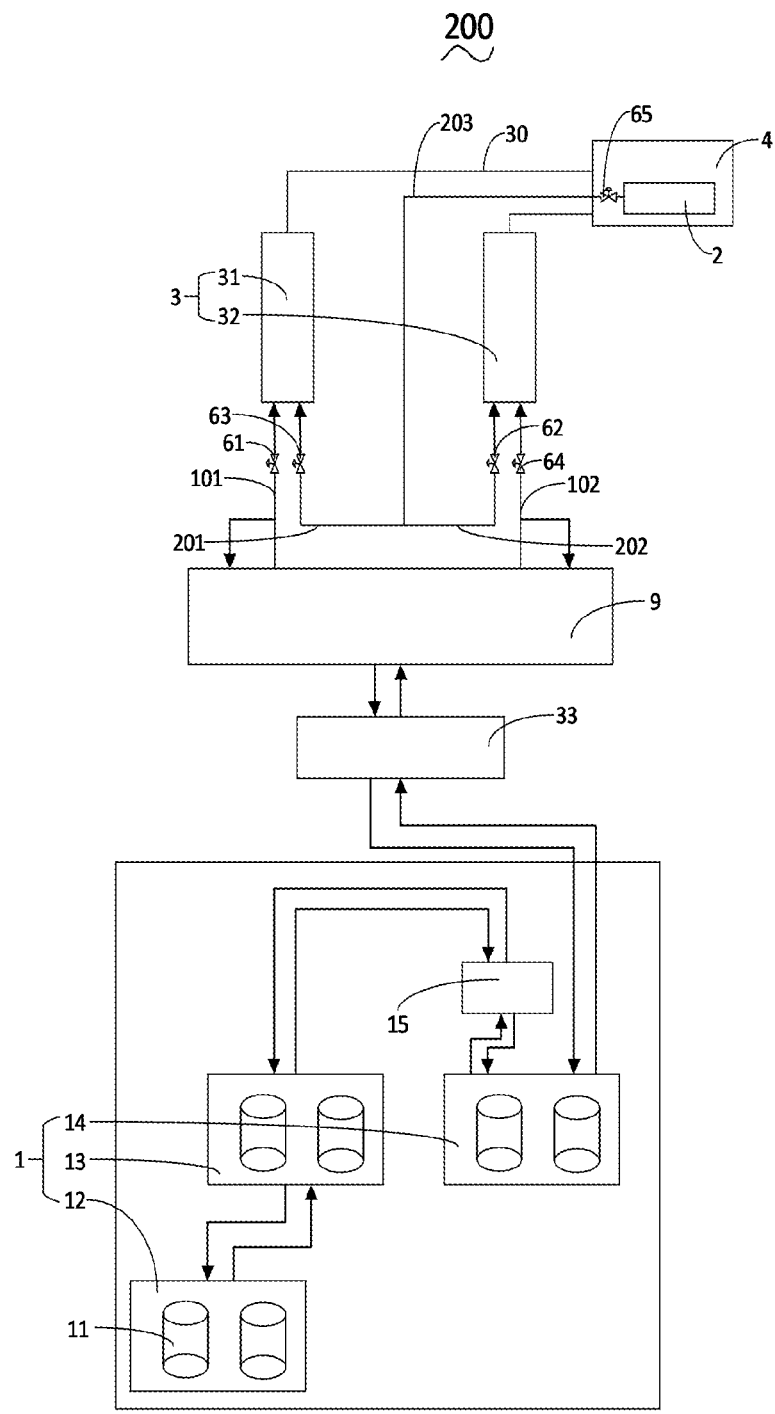
FIG. 4 is a schematic structural diagram of a polishing liquid supply system according to another embodiment of the present application.

Another embodiment of the present application further provides a polishing liquid supply system 200. The present embodiment makes further improvements on the basis of the previous embodiment. A main improvement lies in that, in the present embodiment, as shown in FIG. 4, the filtering device 3 includes a first filtering device 31 and a second filtering device 32. With such structural settings, when the polishing liquid is supplied to the polishing device 4 by either one of the first filtering device 31 and the second filtering device 32, the other one can be cleaned, so that the conveyance of the polishing liquid is not affected by the cleaning of the filtering device 3, thereby improving the working efficiency of the polishing liquid supply system 200.

Specifically, the supply pipeline 10 shown in FIG. 4 includes a first pipeline 101 connected with the polishing liquid preparation device 1 and the first filtering device 31 and a second pipeline 102 connected with the polishing liquid preparation device 1 and the second filtering device 32; and the cleaning pipeline 20 includes a third pipeline 201 connected with the cleaning liquid supply device 2 and the first filtering device 31 and a fourth pipeline 202 connected with the cleaning liquid supply device 2 and the second filtering device 32. It may be understood that the third pipeline 201 is partially overlapped with the fourth pipeline 202; that is, both of them have the same fifth pipeline 203. A third control valve 65 is arranged between the fifth pipeline 203 and the cleaning liquid supply device 2 close to the cleaning liquid supply device 2. Such structural settings can avoid the case where the cleaning liquid in the cleaning liquid supply device 2 flows back to the filtering device 3 to pollute the polishing liquid in the filtering device 3 when the filtering device 3 supplies the polishing liquid to the polishing device 4. It should be noted that the third pipeline 201 and the fourth pipeline 202 may also be two separate pipelines, which can achieve the same technical effect as the foregoing structure, and is not repeated herein to avoid repetition.

More specifically, the combination valve 6 in the present embodiment includes a first control valve 61 that controls switch-on and switch-off of the first pipeline 101, a second control valve 62 that controls switch-on and switch-off of the second pipeline 102, a third control valve 63 that controls switch-on and switch-off of the third pipeline 201 and a fourth control valve 64 that controls switch-on and switch-off of the fourth pipeline 202. For ease of understanding, the following is a specific example of an operation mode of the polishing liquid supply system 200 according to the present embodiment.

When the polishing liquid is required to be supplied to the polishing device 4, if the polishing liquid is to be filtered through the filtering device 31, the first control valve 61 to switch-on, the second control valve 62 to switch-off, the polishing liquid in the polishing liquid preparation device 1 is pumped from the first pipeline 101 into the filtering device 3 through the centrifugal pump, the filtering device 3 filters the polishing liquid, and the filtered polishing liquid is pumped from the drain pipeline 30 into the polishing device 4 through the centrifugal pump. At this point, the second filtering device 32 can be cleaned synchronously, the third control valve 63 to switch-off, the fourth control valve 64 to switch-on, the cleaning liquid in the cleaning liquid supply device 2 flows into the filtering device 3 through the fourth pipeline 202, and the cleaning liquid after use may flow through the drain pipeline 30 to the machine of the polishing device 4 and then be discharged.

In one possible embodiment, an exhaust passage is designed for both internal circulation and external circulation of each filtering device 3, which can be used for damage reduction cleaning before the replacement of the filtering device 3 and for holding pressure after the replacement of the filtering device 3.

In another possible embodiment, pressure sensors are configured ahead of and behind the filtering device 3. After a period of use of the filtering device 3, the amount of sediment (impurities) in a chamber of the filtering device 3 may increase, which may lead to blockage or scaling of elements in the filtering device 3, so that pressure reduction can be detected through the upstream pressure sensor and the downstream pressure sensor of the filtering device 3. Therefore, the pressure sensors configured ahead and behind can reflect the filtration performance of the filtering device 3 in real time. When the filtration performance of the filtering device 3 is poor, the pressure sensor may give an alarm, so that the filtering device 3 can be replaced in time.

In another possible embodiment, when the polishing liquid is supplied to different polishing devices 4, polishing liquid filters of different specifications may be used (that is, filtering devices with different particle sizes may be mounted), and the same mounting bracket can be used to achieve unified and convenient disassembly and assembly. The supply pipeline 10 and the cleaning pipeline 20 adopt different valve set supply systems for switching, so as to flexibly meet different system supply process requirements.

In another possible embodiment, the mounting box includes a detachable cover plate. The periphery of the cover plate is connected to a box body of the mounting box by a movable buckle, so that the cover plate fits more closely to a sealing ring of the box body to achieve a leakage-proof effect. The cover plate may be a transparent PVC cover plate, such that the technical personnel may conveniently look directly at the interior. The technical personnel can remove or open the cover plate to replace and adjust the devices inside the mounting box.

Those of ordinary skill in the art should understand that the above embodiments are specific embodiments for implementing the present application; however, in practical applications, various variations may be made thereto in form and detail without departing from the spirit and scope of the present application. Any person skilled in the art may make respective changes and modifications without departing from the spirit and scope of the present application. Therefore, the protection scope of the present application should be subject to the scope defined by the claims.

The invention claimed is:

1. A polishing liquid supply system, comprising: a polishing liquid preparation device, a cleaning liquid supply device and a filtering device, and further comprising a supply pipeline connected with the polishing liquid preparation device and the filtering device, and a cleaning pipeline connected with the cleaning liquid supply device and the filtering device, wherein the filtering device comprises at least a first filtering device and a second filtering device;

the polishing liquid preparation device being configured to prepare a polishing liquid and convey the prepared polishing liquid to the filtering device through the supply pipeline; the filtering device being configured to filter the polishing liquid and convey the filtered polishing liquid to a polishing device connected with the filtering device; and the cleaning liquid supply device being configured to convey a cleaning liquid to the filtering device through the cleaning pipeline; and, wherein the supply pipeline and the cleaning pipeline are connected to a bottom of the filtering device, a top of the filtering device is further provided with a drain pipeline, and wherein the drain pipeline is configured to convey the filtered polishing liquid outputted from the filtering device to the polishing device;

the supply pipeline comprises a first pipeline connected with the polishing liquid preparation device and the first filtering device, and a second pipeline connected with the polishing liquid preparation device and the second filtering device; and the cleaning pipeline comprises a third pipeline connected with the cleaning liquid supply device and the first filtering device, and a fourth pipeline connected with the cleaning liquid supply device and the second filtering device.

2. The polishing liquid supply system according to claim 1, further comprising a combination valve comprising a first control valve and a second control valve, the first control valve being arranged on the supply pipeline, and the second control valve being arranged on the cleaning pipeline.

3. The polishing liquid supply system according to claim 2, further comprising a control system in communication connections with the first control valve, the second control valve and the polishing device; and the polishing device being further configured to send a first instruction to the control system when the polishing liquid is needed, and the control system being configured to control the first control valve to switch-on and the second control valve to switch-off after receiving the first instruction.

4. The polishing liquid supply system according to claim 2, further comprising a mounting box comprising a fixing bracket, the fixing bracket being configured to fix the combination valve and the filtering device into the mounting box.

5. The polishing liquid supply system according to claim 4, wherein the fixing bracket comprises a first bracket and a second bracket, the first bracket is fixedly connected to the combination valve, the combination valve is fixedly connected to the filtering device, and the filtering device is fixedly connected to the second bracket.

6. The polishing liquid supply system according to claim 4, wherein the mounting box is movably connected to a fixed slot.

7. The polishing liquid supply system according to claim 1, further comprising a first valve box and a polishing liquid circulation pipeline, the polishing liquid circulation pipeline being connected with the polishing liquid configuration device and the filtering device through the first valve box, and the first valve box being configured to control the polishing liquid to be transferred from the filtering device through the polishing liquid circulation pipeline to the polishing liquid preparation device or control the polishing liquid to be transferred from the polishing liquid preparation device through the supply pipeline to the filtering device.

8. The polishing liquid supply system according to claim 7, wherein a primary filtering device is further arranged between the first valve box and the polishing liquid preparation device, the primary filtering device is configured to filter particles with particle sizes greater than a first particle size, the filtering device is configured to filter particles with particle sizes greater than a second particle size, and the first particle size is greater than the second particle size.

9. The polishing liquid supply system according to claim 1, wherein the polishing liquid preparation device comprises a raw polishing liquid supply unit, a polishing liquid mixing tank unit connected with the raw polishing liquid supply unit and a polishing liquid supply tank unit connected with the polishing liquid mixing tank unit, and the polishing liquid supply tank unit is connected with the filtering device through the supply pipeline.

10. The polishing liquid supply system according to claim 9, wherein the polishing liquid mixing tank unit is connected to the polishing liquid supply tank unit through a second valve box, and the second valve box is configured to control the polishing liquid to be transferred from the polishing liquid mixing tank unit to the polishing liquid supply tank unit or control the polishing liquid to be transferred from the polishing liquid supply tank unit to the polishing liquid mixing tank unit.

11. The polishing liquid supply system according to claim 9, wherein each of the polishing liquid mixing tank unit and the polishing liquid supply tank unit is provided therein with a polishing liquid measuring instrument, and the polishing liquid measuring instrument comprises at least one of a specific gravity measuring instrument, a pH measuring instrument and a conductivity measuring instrument.

* * * * *